Figure 1:
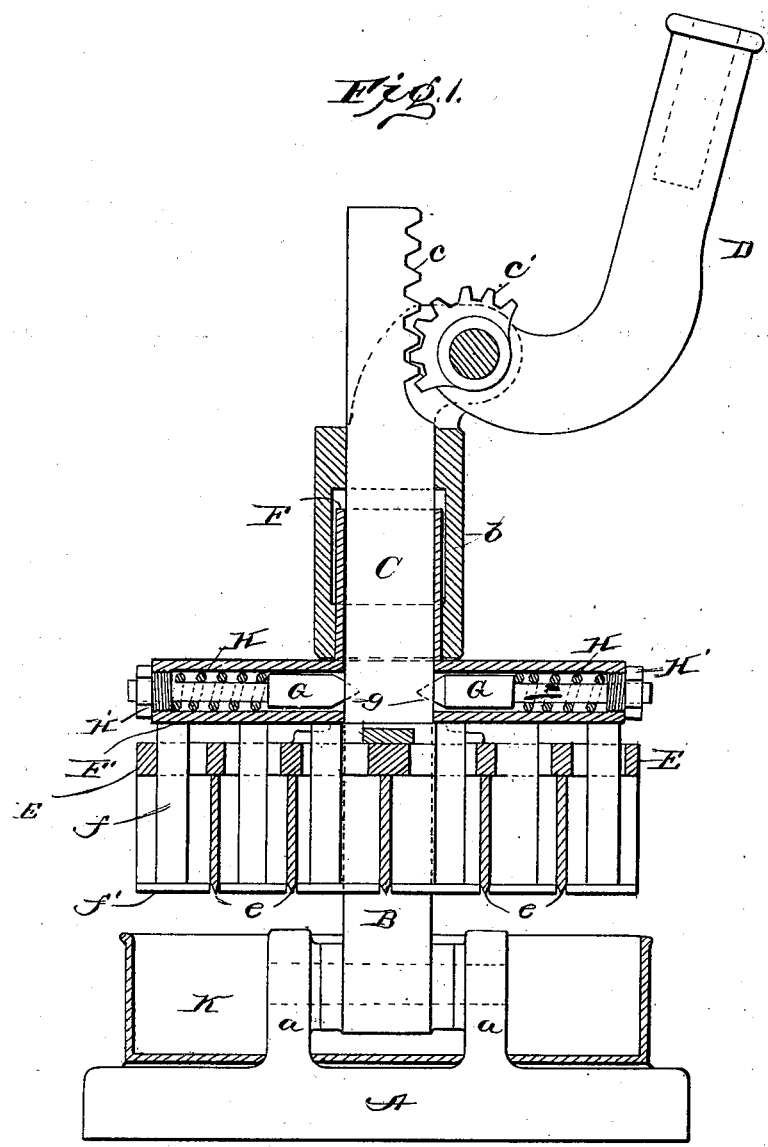

No. 687,088. Patented Nov. 19, 1901.
F. H. VAN HOUTEN.
DOUGH DIVIDER.
(Application filed May 22, 1900. Renewed July 16, 1901.)
(No Model.) 2 Sheets—Sheet 1.

No. 687,088. Patented Nov. 19, 1901.
F. H. VAN HOUTEN.
DOUGH DIVIDER.
(Application filed May 22, 1900. Renewed July 16, 1901.)
(No Model.) 2 Sheets—Sheet 2.
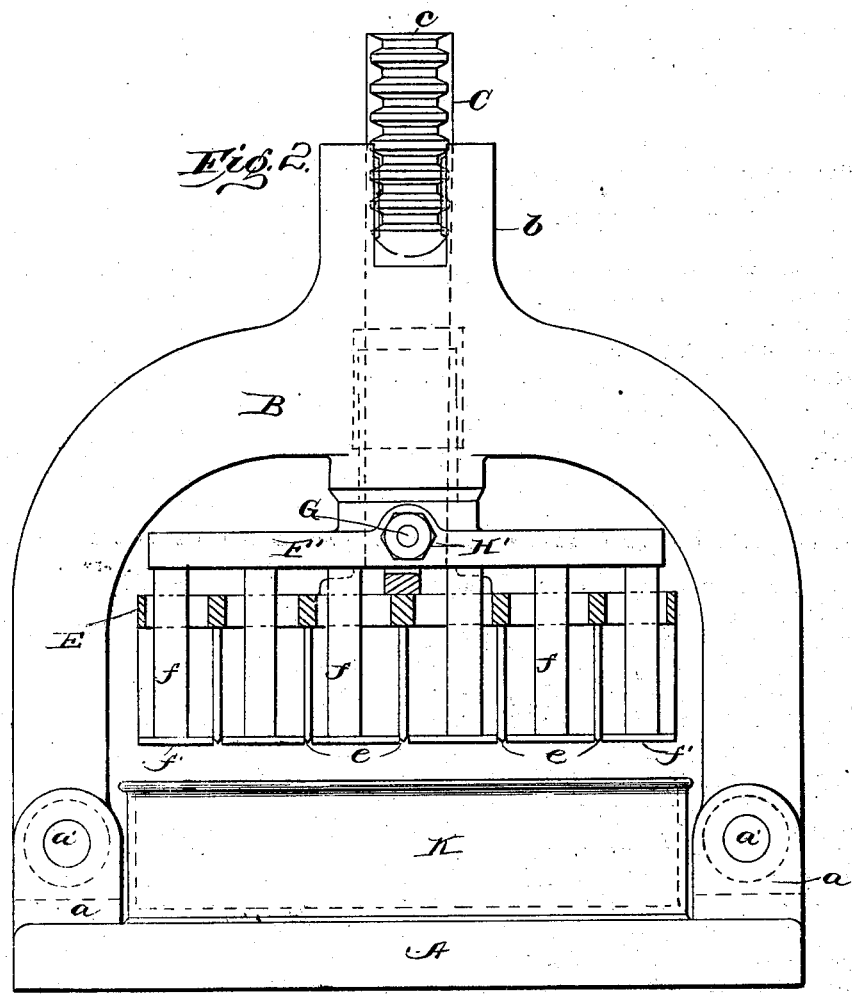
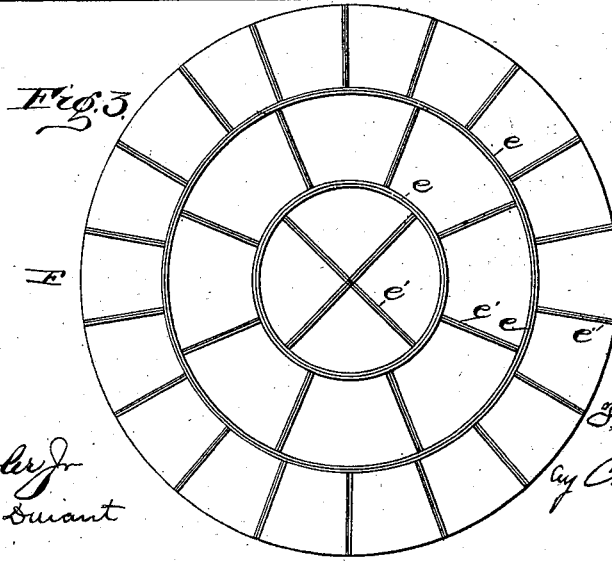

United States Patent Office.

FRANK H. VAN HOUTEN, OF FISHKILL ON THE HUDSON, NEW YORK, ASSIGNOR TO DUTCHESS TOOL COMPANY, OF FISHKILL ON THE HUDSON, NEW YORK, A CORPORATION OF NEW YORK.

DOUGH-DIVIDER.

SPECIFICATION forming part of Letters Patent No. 687,088, dated November 19, 1901.

Application filed May 22, 1900. Renewed July 16, 1901. Serial No. 68,543. (No model.)

*To all whom it may concern:*

Be it known that I, FRANK H. VAN HOUTEN, a citizen of the United States, residing at Fishkill on the Hudson, in the county of Dutchess and State of New York, have invented certain new and useful Improvements in Dough-Dividers; and I do hereby declare the following to be a full, clear, and exact description of the same, reference being had to the accompanying drawings, forming a part of this specification, and to the letters of reference marked thereon.

This invention relates to improvements in dough-dividers or machines for subdividing a batch of dough into separable pieces for baking in the form of small loaves or rolls; and the improvements relate more especially, though not exclusively, to that class of machines wherein the dough is divided in a pan or receptacle into which the batch is placed and which pan or receptacle is then placed in the machine.

The invention has for its object to provide a simple, convenient, and compact form of apparatus wherein the batch of dough is pressed to the desired thickness and density and then subdivided by one and the same continued movement of the single operating handle or lever.

The invention consists in certain novel details of construction and combinations and arrangements of parts, all as will be now described, and pointed out particularly in the appended claims.

In the accompanying drawings, Figure 1 is a vertical section taken centrally through a machine embodying the present invention. Fig. 2 is a view, partly in section, taken at right angles to Fig. 1. Fig. 3 is a bottom plan view showing the arrangement of presser-plates and knives.

Like letters of reference in the several figures indicate the same parts.

The letter A indicates the bed-plate or base of the machine, usually a substantially flat and relatively thick plate of metal adapted for the reception of the pan or receptacle which contains the batch of dough, and in the form shown it is provided on two of its sides with upwardly-extending lugs or ears $a$, adapted to support and retain in position an arch-shaped frame or yoke B for supporting the working parts of the machine. The attachment between the ends of the yoke and lugs or ears $a$ is preferably formed by pins $a'$, either one of which may be removed to allow the yoke to swing upwardly upon the other pin as a center for cleaning the parts of the apparatus carried by the yoke. At the center of the yoke there is formed a substantially vertical bearing $b$, in which slides a vertically-movable stem or spindle C, adapted at its lower end to carry the knives to subdivide the dough and at its upper end to be connected with the operating lever or handle. For the latter purpose the upper end of the spindle C is formed into or provided with a rack-bar $c$, with which meshes a gear-segment $c'$, journaled in transverse bearings on the yoke and forming the inner end of or connected for operation with the handle or lever D. The lower end of the spindle is formed with or constitutes the support for the spider or frame E, from which the concentrically and radially arranged knives $e\ e'$ depend, the arrangement of the knives in plan view being as usual in this class of machines and preferably as illustrated in Fig. 3, although they may be arranged to suit any particular user or to give any desired quantity of dough in the several subdivisions.

Surrounding the spindle C and preferably also extending up into the bearing $b$, so as to be supported externally thereby, is a second spindle or tubular extension F, adapted to support the pressing and spreading plates or surfaces, which give the preliminary conformation to the batch of dough after the same is placed in the machine. As a convenient means for supporting these plates the said spindle F constitutes an upwardly-extending projection on the plate or frame F', preferably substantially circular in shape to conform to the shape of the subdivided batch of dough, and to the under surface of this plate or frame F' the stems $f$ of the pressing faces or plates $f'$ are attached in any suitable or usual manner.

As thus far described, it will be seen that the operating-handle controls the knife-spindle in its vertical movements, while the pressing-frame is practically free in its movements, but under the action of gravity would, of course, follow the knife-frame downwardly when the latter was moved in that direction, and, on the other hand, would be forcibly raised by the knife-frame into its uppermost or initial position. In order now to secure the requisite degree of pressure for the purpose of spreading and condensing the batch of dough, I have in the present instance provided a yielding connection between the knife and presser frames, whereby the two will be caused to move downward in unison until the pressure upon the presser-frame due to the compression of the dough is sufficient to release the connection between the two frames and allow the presser-frame to remain stationary, while the knives continue their downward movement and subdivide or sever the dough into the desired number of sections. The most convenient form of such connection is that illustrated in the accompanying drawings, wherein it will be seen that in this form of machine I have provided the central spindle of the knife-frame with recesses $g$, and the presser-frame I have provided with spring-pressed pins G, having conical or tapered ends adapted to seat in said recesses $g$ and so lock the two frames together until the resistance offered to the forward movement of the presser-frame becomes sufficient to cause the pins to retreat against the tension of their springs and so disconnect the two frames. In the preferred construction of apparatus the pins G are mounted in transverse ways or channels in the plate constituting the body of the presser-frame, and at their rear ends they are reduced somewhat in diameter for the accommodation of the advancing-springs H. These springs are held in place and their outer ends confined by plugs or nuts H', threaded into the outer ends of the channels or ways for the pins, and where desired the tension of the springs may be adjusted by setting the nuts or plugs in or out, as the case may be.

The operation of the machine will now be apparent, and assuming that the batch of dough has been placed in the pan and the pan K has been placed in position, as illustrated in Fig. 2, the operator grasping the handle will draw the same down and through the segment and rack cause the central spindle, together with the knife and presser plates, to descend, and these two frames being locked together with the presser-plates and cutting edges of the knives in alinement, as illustrated in Fig. 1, will cause the dough to be spread and condensed in the bottom of the pan. The pressure of the springs and pins having been regulated to the requirements of the particular case in hand, when the desired pressure or spreading out or condensation of the dough has taken place the presser-frames will be arrested in its further downward movement, but the knife-frame will continue to move downwardly until the knives have penetrated the dough. On the return movement of the operating-handle the knives will withdraw from the dough, the weight of the presser-frame preventing the dough from drawing up with the knives until the parts have again assumed a position where the pins will enter the recesses in the central spindle, and the further upward movement will elevate both frames into their normal or initial position ready for subsequent operations.

Having thus described my invention, what I claim as new, and desire to secure by Letters Patent, is—

1. In a dough-divider the combination with the supporting-frame, the knife-frame, the central spindle connected with the knife-frame and having a recess with inclined walls in the side thereof, the rack connected with the spindle and the segment and operating-handle for moving said spindle and knife-frame, of the presser-frame surrounding the spindle and having a limited movement independent thereof and a spring-pressed bolt on the presser-frame adapted to engage the recess in the spindle when the presser-frame is at one extreme of its movement to connect said parts but adapted to be automatically moved out of said recess when the movement of the presser-frame is retarded, thereby permitting the knife-frame to advance without resistance by the presser-frame; substantially as described.

2. In a dough-divider the combination with the supporting-frame, the knife-frame, the central spindle connected with the knife-frame and having recesses with inclined walls in opposite sides thereof, the rack connected with the spindle and the segment and operating-handle for moving said spindle and knife-frame, of the presser-frame surrounding the spindle and having a limited movement independent thereof, oppositely-movable spring-pressed bolts carried by the presser-frame having pointed ends coöperating with the recesses in the spindle when the presser-frame is at one extreme of its independent movement and adapted to be automatically moved out of said recesses when the movement of the presser-frame is retarded and when out of the recesses to allow the spindle and knife-frame to descend without resistance from the presser-frame; substantially as described.

FRANK H. VAN HOUTEN.

Witnesses:
ALICE M. KEANE,
J. E VAN HOUTEN.